United States Patent [19]

Cassola et al.

[11] Patent Number: 4,877,832
[45] Date of Patent: Oct. 31, 1989

[54] THERMOSET RESIN COMPOSITIONS

[75] Inventors: Adrian Cassola; John C. Kwok; Keith J. Robinson; Brian H. A. Smith, all of Sarnia, Canada; Michel Longuet, Strasbourg, France

[73] Assignee: Polysar Limited, Sarnia, Canada

[21] Appl. No.: 143,322

[22] Filed: Jan. 13, 1988

Related U.S. Application Data

[63] Continuation-in-part of Ser. No. 942,259, Oct. 29, 1986, abandoned.

[51] Int. Cl.$^4$ .............................................. C08L 67/06
[52] U.S. Cl. ..................................... 525/64; 523/522; 525/169
[58] Field of Search ........................... 525/64; 523/522

[56] References Cited

U.S. PATENT DOCUMENTS

| | | | |
|---|---|---|---|
| 3,577,478 | 5/1971 | Thorpe | 524/178 |
| 3,701,748 | 10/1972 | Kroekel | 523/523 |
| 3,857,812 | 12/1974 | Nowak | 523/514 |
| 3,998,909 | 12/1976 | Roberts | 525/64 |
| 4,096,102 | 6/1978 | Strauss | 528/295.3 |
| 4,160,759 | 7/1979 | Gardner | 525/166 |
| 4,336,344 | 6/1982 | Craigie | 525/31 |

*Primary Examiner*—Patricia Short
*Attorney, Agent, or Firm*—Stevens, Davis, Miller & Mosher

[57] ABSTRACT

This invention relates to unsaturated polyester compositions having improved impact resistance and good surface appearance. The compositions contain a novel additive. The novel additive comprises the partially polymerized product of a mixture comprising an elastomer and a styrenic monomer.

6 Claims, No Drawings

THERMOSET RESIN COMPOSITIONS

This application is a continuation-in-part of application Ser. No. 924,259, filed Oct. 29, 1986, now abandoned

BACKGROUND OF THE INVENTION

This invention relates to unsaturated polyester molding compounds having improved impact resistance and good surface appearance.

Unsaturated polyesters are well known. They may be prepared, for example, by condensing an ethylenically unsaturated dicarboxylic acid or anhydride with a dihydric alcohol.

Unsaturated polyesters are conventionally used in molding compounds in combination with an unsaturated monomer which is polymerizable with the polyester. The unsaturated monomer participates in the crosslinking of the composition during the curing reaction. Molding compounds which contain only an unsaturated polyester and an unsaturated monomer usually exhibit poor surface gloss and are prone to shrinkage during curing. Furthermore, these compounds typically exhibit poor impact strength.

Additives have therefore been developed to reduce the shrinkage and improve the surface appearance of moldings prepared from unsaturated polyesters. Similarly, additives have also been developed to improve the impact strength of these compounds.

Certain thermoplastic additives are particularly suitable to improve surface appearance and reduce shrinkage. For example, U.S. 3,701,748, to Kroekel, teaches the use of from 1 to 25 parts of a "thermoplastic polymer" to improve the surface of moldings made from unsaturated polyesters.

U.S. Pat. No. 3,998,909, to Roberts et al., teaches the use of a "thermoplastic composition" to improve the surface characteristics, including shrink and gloss, of molded thermosetting resin compounds.

U.S. Pat. No.4,096,102, to Strauss et al., teaches the use of "thermoplastic additives" to reduce the "shrinkage on molding" of unsaturated polyester resins.

Thus, the use of thermoplastic additives in unsaturated polyester molding compounds is well known.

Similarly, certain elastomeric additives are particularly suitable to help improve the impact strength of moldings made from unsaturated polyesters.

U.S. Pat. No. 3,857,812, to Nowak et al., teaches the use of from 5 to 15 parts of a "polydiene rubber" having a specified viscosity and molecular weight as an additive in a thermosettable compositoin suitable for preparing impact resistant plastic articles.

U.S. Pat. No. 3,577,478, to Thorpe, teaches a blend of a polymer of butadiene with an unsaturated polyester compound to prepare a blended product with high impact strength.

U.S. Pat. No. 4,336,344 to Craigie, teaches the use of a combination of a carboxy terminated polydiene rubber and a triblock polymer "compatibilizing agent" as an additive to unsaturated polyester molding compounds.

U.S. Pat. No. 4,160,759, to Gardner et al., teaches the use of a "conjugated diene butyl rubber" as an additive in a polyester molding compound having improved impact strength. It is also significant to note that Gardner also teaches the preferred use of a further thermoplastic polymer additive.

Thus, the use of elastomeric additives in unsaturated polyester molding compounds is well known.

SUMMARY OF THE INVENTION

The present invention provides an unsaturated polyester molding composition, suitable for preparing an impact resistant thermoset having improved impact strength, surface appearance and reduced shrinkage, the composition comprising:
(a) 30-65 parts by weight of an unsaturated polyester, and correspondingly
(b) 70-35 parts by weight of a first monomer composition, the monomer composition being copolymerizable with the unsaturated polyester and comprising at least one ethylenically unsaturated monomer,
(c) a polymerization initiator, and
(d) a partially polymerized additive, the additive comprising the polymerization product of a dispersion comprising:
 (i) between 97 and 85 weight per cent of a second monomer composition comprising styrenic monomer, and correspondingly
 (ii) between 3 and 15 weight per cent of single, solid elastomer selected from the group consisting of polybutadiene homopolymer, and emulsion polymerized acrylonitrile-butadiene copolymer
 and wherein the elastomer is dispersed within the second monomer composition,
 and wherein the additive is prepared according to the process whereby the dispersion is polymerized under stirred conditions such that the extent of conversion of the second monomer composition is between 10 and 90 per cent,
 and wherein the additive is present in a quantity sufficient to provide between 1.5 and 10 parts by weight of the elastomer per 100 parts combined weight of the polyester plus the first monomer composition.

In another aspect of the present invention, the partially polymerized additive will be added in an amount sufficient to provide between 2 and 5 parts by weight of the elastomer per 100 parts combined weight of the unsaturated polyester and first monomer composition.

In a further aspect of the present invention, the molding composition also includes a fibrous reinforcing agent and fillers.

The present invention also provides a process to prepare a molding paste suitable for preparing an impact resistant thermoset having good surface appearance, said process comprising admixing a composition comprising:
(a) 30-6 parts by weight of an unsaturated polyester, and correspondingly
(b) 70-35 parts by weight of a first monomer composition, said monomer composition being copolymerizable with said unsaturated polyester and comprising at least one ethylenically unsaturated monomer,
(c) a polymerization initiator, and
(d) a partially polymerized additive, said additive comprising the polymerization product of a dispersion comprising:
 (i) between 97 and 85 weight per cent of a second monomer composition comprising at least one styrenic monomer, and correspondingly
 (ii) between 3 and 15 weight per cent of a single, solid elastomer selected from the group consisting of polybutadiene homopolymer, and emulsion polymerized acrylonitrile-butadiene copolymer, and wherein said elastomer is dispersed within said second monomer composition,
and wherein said additive is prepared according to the process whereby said dispersion is polymerized such that the extent of conversion of said second monomer composition is between 10 and 90 per cent,
and wherein said additive is present in a quantity sufficient to provide between 1.5 and 10 parts by weight of said elastomer per 100 parts combined weight of said polyester plus said first monomer composition, and wherein the paste is characterized by having adequate paste stability.

As used herein, the term dispersion is meant to include dispersions and solutions.

DETAILED DESCRIPTION

The unsaturated polyesters which are useful in accordance with this invention are well known and may generally be described as the reaction product of an ethylenically unsaturated polycarboxylic acid compound, or anhydride thereof, or a mixture of the acid and nahydride, with a polyhydric alcohol. Preferred polycarboxylic acids are maleic acid, fumaric acid and phthalic acid. Preferred anhydrides are maleic anhydride, fumaric anhydride and phtalic anhydride. Preferred alcohols are ethylene glycol, propylene glycol and neopentyl glycol.

Unsaturated polyesters are conventionally used in combination with an ethylenically unsaturated monomer which is copolymerizable with the unsaturated polyester. Preferred monomers are styrene and vinyl toluene. Acrylate monomers ar also suitable. It is also known to use monomer compositions comprising mixtures of more than one monomer.

The molding compounds according to the present invention may also include one or more of the following conventional components which are employed for their conventional purposes: polymerization initiators, pigments, lubricants, mold release agents, thickeners, fillers and reinforcing fibres.

Polymerization initiators, also referred to as catalysts, are used to initiate the reaction which cures the molding compound. Tertiary butyl perbenzoate is normally used for this purpose, although it is also well known that other free radical sources, for example, organic hydroperoxides, are also suitable.

Suitable fillers include clay, and inorganic fillers such as calcium carbonate and alumina trihydrate.

Suitable lubrications include metal stearates, especially zinc stearate.

Conventional mold release agents, such as silicone-based release agents, may be included in the compounds according to the present invention.

The use of reinforcing fibres, such as fibreglass, in unsaturated polyester molding compositions is well known to those skilled in the art and is within the scope of the molding compounds of the present invention.

The compositions of the present invention must include a partially polymerized additive. The composition of the additive comprises a single, solid elastomer and a monomer composition comprising at least one styrenic monomer. By styrenic monomer, it is meant styrene or another monovinyl substituted aromatic rubber.

A single, solid elastomer selected from emulsion polymerized acrylonitrile-butadiene rubber (NBR) and polybutadiene (BR) homopolymer is used in the preparation of the essential partially polymerized additive. Commercially available, solid NBR and BR are suitable. The present invention does not employ liquid elastomers, such as liquid NBR (for example Hycar CTBN ®, sold by B. F. Goodrich) or liquid BR having a molecular weight below 40,000.

Suitable monomer compositions contain styrene or vinyl toluene, or mixtures thereof, and may contain further ethylenically unsaturated monomers.

The partially polymerized additive is prepared by forming a dispersion fo between 3 and 15 weight per cent of a suitable unsaturated elastomer in between 97 and 85 weight per cent of a suitable monomer, and then initiated polymerization of the dispersion. The polymerization is stopped when the monomer conversion is between 10 and 90%. Additional, unreacted monomer may then be added to the partially polymerized additive, if desired.

The polymerization of the dispersion may be thermally initiated or initiated by a free radical initiator such as benzoyl peroxide or azo bis isobutyronitrile. It is essential that the polymerization of the dispersion be carried out under stirred conditions. A chain transfer agent, such as a tertiary mercaptan, may also be included in the preparation of the partially polymerized additive.

The amount of partially polymerized additive used in molding compounds according to the present invention may be conveniently expressed as parts, by weight, per 100 parts combined weight of the unsaturated polyester plus first monomer composition. Preferably, the amount of additive used may be expressed as the amount of partially polymerized additive required to provide a specific quantity of the elastomer per 100 parts combined weight of the unsaturated polyester plus first monomer composition. Thus, preferred molding compoundings according to the present invention contain an amount of the partially polymerized additive sufficient to provide between 1.5 and 10 parts by weight of the elastomer per 100 parts by weight of unsaturated polyester plus first monomer composition.

The compositions of the present invention are typically formed into molding pastes before being polymerized into the final thermoset resins. The inventive molding pastes are characterized by having adequate paste stability, meaning that they remain essentially homogeneous for at least several hours after mixing is completed. Pastes with very good stability remain essentially homogeneous for up to several weeks. In contrast, comparative molding pastes with poor paste stability separate into distinct phases shortly after mixing. This causes problems with the subsequent formation of molded parts and hence is extremely undesirable.

The invention is further illustrated by the following non-limiting examples.

The following elastomers were used in the inventive examples.

NBR 1 —a solid, emulsion polymerized elastomer of acrylonitrile and butadiene (NBR) having a bound acrylonitrile content of approximately 19 weight per cent, and a Mooney viscosity ($ML_{1+4}$ at 100° C.) of about 65 sold under the tradename KRYNAC 19.65 by Polysar Limited.

NBR 2 —a solid, emulsion polymerized NBR having a bound acrylonitrile content of approximately 27 weight per cent, and a Mooney viscosity of about 50 sold under the tradename KRYNAC 27.50 by Polysar Limited.

NBR 3 —a solid, emulsion polymerized NBR having a bound acrylonitrile content of approximately 34 weight per cent, and a Mooney viscosity of about 50 sold under the tradename KRYNAC 34.50 by Polysar Limited.

BR—A solid stereoregular polybutadiene elastomer having more than 95 per cent cis configuration and a Mooney viscosity of about 40 sold under the tradename TAKTENE 1202 by Polysar Limited.

The unsaturated polyester used in all examples was a commercially available resin consisting essentially of fumaric acid and propylene glycol, sold as a 60 percent dispersion in styrene under the tradename 3702.5 by Koppers Company, Inc.

EXAMPLE 1

This example relates to the preparation of partially polymerized additives which are suitable for use in molding compounds according to the present invention.

Partially polymerized additives A and B were prepared according to the following procedure.

The composition of the additives A and B is shown in Table I.

The elastomer was cut into small pieces and added to the monomer. The resulting mixture was stirred for approximately 2 days at room temperature under mild agitation to prepare a dispersion.

The dispersion was then polymerized at approximately 85° C., using a benzoyl peroxide initiator.

The dispersion was stirred by an agitator rotating at approximately 100 rpm during the polymerization.

The extent of conversion was monitored by measuring the solids content of the partially polymerized dispersion. The polymerization was terminated by cooling the reaction mixture, at the conversion levels as shown in Table 1.

TABLE 1

| Experiment | 1 | 2 |
|---|---|---|
| Additive Name | A | B |
| Monomer type | Styrene | Styrene |
| Parts of monomer, by weight | 93 | 85 |
| Elastomer type | NBR 1 | NBR 1 |
| Parts of elastomer, by weight | 7 | 15 |
| Conversion of monomer, % | 30.0% | 23.5% |

EXAMPLE 2

Unsaturated polyester compositions were prepared according to the compositions shown in Table 2. Inventive experiments 3 and 4 contain, respectively, the partially polymerized additives A and B prepared according to example 1. Control Experiment 5 does not contain an additive. For each experiment, all ingredients except the carbonate were added to a one gallon can and blended for about 10 minutes, using a 4" impeller at a speed of approximately 1800-2000 rpm.

The carbonate was then added and the mixture blended for a further 25 minutes (or until the temperature reached 45° C., whichever came first) to form a paste, referred to as a molding paste. Samples of the paste were retained for testing.

The molding paste was then transferred to a sigma blade mixer. Molding compounds were prepared from the paste by adding 66.2 parts by weight of ¼" glass fibres per 100 parts combined weight unsaturated polyester plus styrene and blending for 3 minutes. This corresponds to a molding compound containing 15 weight per cent fiberglass.

The molding compounds were allowed to mature for at least 12 hours before molding.

The molding compounds were catalysed with 1.4 parts t-butyl perbenzoate per 100 parts combined unsaturated polyester plus styrene and molded for 3 minutes at 300° F. to form molded sheets. The molded sheets were prepared in 6"×6"×⅛" sheet mold at a molding pressure of 1000 psi.

Physical property testing was carried out according to ASTM standards.

Tensile strength measurements were made according to ASTM Procedure D638.

Flexural strength and flexural modulus measurements were made according to ASTM D790.

Izod impact test measurements were made according to ASTM D256.

Barcol hardness measurements were made according to ASTM D2583.

All of the above physical property measurements were made on test specimens prepared from ⅛" thick flat molded sheets.

The surface appearance of the molded sheets was rated on a scale between 1 and 10, with a ratng of 10 being the best. Waviness, gloss and porosity of the surface wre considered. Reflectng a grid pattern off the surface of the molded sheets is helpful in establishing a surface rating. The shrinkage of the molded sheets was determined by comparing the dimensions of the sheets to the dimensions of the mold (with both the sheet and mold at room temperature).

The shrinkage across the molded sheets was measured at three points (midpoint and one inch from the edges) and averaged. Vernier calipers sccurate to 0.0001" were used. The shrinkage is expressed as mils of shrinkage per 6". (A negative value indicates that the sheet expanded during the curing reaction.)

Properties of the molding paste were also considered. The molding paste viscosity was measured at 25° C. and at 50° C. using a Brookfield HBT Viscosmeter. Relatively low paste viscosities are referred as high paste viscosities may cause problems with the fibre mixing step.

The stability of the molding paste was rated on a scale ranging from very poor to very good. Poor paste stability indicates that the molding paste separates into distinct phases very quickly after mixing. Poor paste stability causes problems when attempting to obtain reproducible molded parts and hence is very undesirable.

Very good paste stability indicates that the molding paste showed no sign of phase separation after standing for several weeks.

TABLE 2

| Experiment | 3 | 4 | 5 |
|---|---|---|---|
| Additive (all parts by weight) | A | B | None |
| parts additive | 45.5 | 45.5 | 0.0 |
| parts unsaturated polyester | 53.0 | 53.0 | 53.0 |
| parts styrene | 47.0 | 47.0 | 47.0 |
| parts black pigment | 0.7 | 0.7 | 0.7 |
| parts calcium carbonate | 224.0 | 224.0 | 224.0 |
| parts zinc stearate | 3.2 | 3.2 | 3.2 |
| parts t-butyl perbenzoate | 1.4 | 1.4 | 1.4 |
| Physical properties: | | | |
| paste stability | good | adequate | very good |
| paste viscosity (cps), 25° C. | 58,100 | 76,800 | 13,400 |
| surface rating | 7¾ | 7½ | 1 |
| shrinkage (mils/6 inches) | 1.0 | 3.6 | 34.1 |
| tensile strength (MPa) | 25.6 | 23.7 | 18.6 |

TABLE 2-continued

| Experiment | 3 | 4 | 5 |
|---|---|---|---|
| flex strength (MPa) | 99 | 102 | 62 |
| flex modulus (GPa) | 8.8 | 9.5 | 7.6 |
| notched Izod impact (ft.lbs/in) | 4.0 | 3.3 | 3.3 |
| reverse notched Izod (ft.lbs/in) | 4.3 | 3.7 | 2.9 |
| Barcol hardness | 63 | 57 | 78 |
| % elastomer in compound | 0.8% | 1.8% | 0 |

The molded sheet of control experiment 5 exhibits high shrinkage and poor surface appearance.

The molded sheets of inventive experiments 3 and 4 exhibit reduced shrinkage, improved surface appearance and improved impact strength.

EXAMPLE 3

Example 3 provides comparative experiments relating to the use of elastomer-in-styrene dispersions as unsaturated polyester additives.

Comparative additives C and D were prepared by adding an elastomer to styrene. The elastomer visually appears to dissolve, but since the system may not form a true solution, it is referred to as a dispersion. The composition of comparative additives C and D is shown in Table 3.

The dispersion additives were incorporated into molding paste compositions using the procedures previously described in Example 2. The molding compounds were then prepared according to the procedures described in Example 2, and again contained 15 weight per cent fiberglass.

The comparative molding compounds were used to prepare flat molded sheets, again according to the procedure described in Example 2.

The composition of the molding compounds, and the properties of the molded sheets are shown in Table 4. The poor stability of the molding pastes prepared with additives C and D is noted in Table 4. Therefore, these additives are clearly not suitable. Furthermore, the dispersion additives C and D do not efficiently modify the properties of the molded sheets. The high shrinkage and poor surface appearance of the molded sheet of Experiment 6 is clearly illustrated by the results shown in Table 4.

TABLE 3

| Experiment | 6 | 7 |
|---|---|---|
| Additive Name | C | D |
| Monomer type | Styrene | Styrene |
| Parts monomer, by weight | 85 | 70 |
| Elastomer type | BR | BR |
| Parts elastomer, by weight | 15 | 30 |

TABLE 4

| Experiment | 8 | 9 |
|---|---|---|
| Additive Name (all parts by wt.) | C | D |
| parts additive | 45.5 | 45.5 |
| parts unsaturated polyester | 53.0 | 53.0 |
| parts styrene | 47.0 | 47.0 |
| parts black pigment | 0.7 | 0.7 |
| parts calcium carbonate | 224.0 | 224.0 |
| parts zinc stearate | 3.2 | 3.2 |
| parts t-butyl perbenzoate | 1.4 | 1.4 |
| Physical properties: | | |
| paste stability | poor | very poor |
| paste viscosity (cps), 25° C. | 61,000 | 10,300 |
| surface rating | 5½ | 4 |
| shrinkage (mils/6") | 10.3 | 0.9 |
| tensile strength (MPa) | 27.7 | 26.5 |
| flex strength (MPa) | 91 | 125.7 |

TABLE 4-continued

| Experiment | 8 | 9 |
|---|---|---|
| flex modulus (GPa) | 6.8 | 9.4 |
| notched Izod impact (ft.lbs/in) | 4.1 | 3.5 |
| reverse notched Izod (ft.lbs/in) | 5.1 | 4.2 |
| Barcol hardness | 44 | 55 |
| % elastomer in compound | 1.8 | 3.6 |

EXAMPLE 4

Example 4 provides inventive experiments which further illustrate the use of partially polymerized additives.

Partially polymerized additives E, F and G were prepared according to the procedures described in example 1. The compositions of these additives is shown in Table 5.

Molding pastes were then prepared, according to the procedures previously described in Example 2. The composition of the molding pastes is shown in Table 6.

The molding compounds were prepared using the procedures described in Example 2 and the molding compounds again contained 15 weight per cent fiberglass.

The molding sheets were prepared and tested according to the procedures described in Example 2.

TABLE 5

| Experiment | 10 | 11 | 12 |
|---|---|---|---|
| Additive Name | E | F | G |
| monomer type | Styrene | Styrene | Styrene |
| parts monomer, by weight | 86 | 85 | 85 |
| elastomer type | NBR 2 | NBR 3 | BR |
| parts elastomer, by weight | 15 | 15 | 15 |
| conversion of monomer, % | 27.0 | 24.2 | 24.6 |

TABLE 6

| Experiment | 15 | 16 | 17 |
|---|---|---|---|
| Additive (all parts by weight) | E | F | G |
| parts additive | 45.5 | 45.5 | 45.5 |
| parts unsaturated polyester | 53.0 | 53.0 | 53.0 |
| parts styrene | 47.0 | 47.0 | 47.0 |
| parts black pigment | 0.7 | 0.7 | 0.7 |
| parts calcium carbonate | 224.0 | 224.0 | 224.0 |
| parts zinc stearate | 3.2 | 3.2 | 3.2 |
| parts t-butyl perbenzoate | 1.4 | 1.4 | 1.4 |
| Physical properties: | | | |
| paste stability | good | adequate | adequate |
| paste viscosity (cps), 25° C. | 47,400 | 57,100 | 48,800 |
| surface rating | 7½ | 7½ | 5 |
| shrinkage (mils/6") | 3.9 | 1.5 | 3.8 |
| tensile strength (MPa) | 37.0 | 43.0 | 30.9 |
| flex strength (MPa) | 88 | 86 | 81 |
| flex modulus (GPa) | 7.7 | 7.7 | 9.6 |
| notched Izod impact (ft.lbs/in) | 4.5 | 4.4 | 3.6 |
| reverse notched Izod (ft.lbs/in) 6.3 | 6.9 | 4.8 | |
| Barcol hardness | 61 | 55 | 59 |
| % elastomer in compound | 1.8 | 1.8 | 1.8 |

The molding pastes of experiments 15, 16 and 17 all demonstrate adequate stability. Furthermore, the molded sheets of experiments 15, 16 and 17 all exhibit low shrinkage, good surface appearance and improved impact strength.

EXAMPLE 5

Example 5 relates to the preparation of a partially polymerized additive using a thermal polymerization process. Example 5 further relates to inventive compositions containing more than one type of styrenic monomer.

15 parts by weight polybutadiene (the aforesaid BR) was cut into small pieces and added to 84.9 parts by weight vinyl toluene and 0.1 parts by weight of a chain transfer agent (a mixed alkyl tertiary mercaptan having an average alkyl molecular weight corresponding to dodecyl mercaptan). The resulting mixture was mixed for two days under mild agitation to prepare a starting dispersion.

The dispersion was thermally polymerized at 120° C. while being gently agitated by a 100 rpm mixer. The extent of conversion was monitored by periodically measuring the solids content of the partially polymerized dispersion. The polymerization was terminated at 25.9% conversion to provide a partially polymerized additive.

A molding paste was prepared from this additive and the other ingredients shown in Table 7. The procedure described in Example 2 was used to prepare the paste. Paste properties are shown in Table 7. In particular, the molding paste demonstrated good paste stability.

A molding compound was then prepared by adding chopped fiberglass to the molding paste, as previously described in Example 2, such that the molding compound contained 15 weight per cent fiberglass.

Molded sheets were then prepared and tested according to the procedures described in Example 2. The results are shown in Table 7.

TABLE 7

| Experiment (all parts by wt.) | 19 |
| --- | --- |
| parts additive | 45.5 |
| parts unsaturated polyester | 53.0 |
| parts styrene | 47.0 |
| parts black pigment | 0.7 |
| parts calcium carbonate | 224.0 |
| parts zinc stearate | 3.2 |
| Physical properties: | |
| paste stability | good |
| paste viscosity (cps), 25° C. | 79,040 |
| surface rating | 8 |
| shrinkage (mils/6 inches) | 4.8 |
| tensile strength (MPa) | 27.4 |
| notched Izod impact (ft.lbs/in) | 2.8 |
| reverse notched Izod (ft.lbs/in) | 3.8 |
| Barcol hardness | 54 |
| % elastomer in compound | 1.8 |

EXAMPLE 6

Example 6 relates to the preparation of highly pigmented molding compositions.

5 parts by weight polybutadiene (the aforesaid BR) was added to a mixture comprising 4 parts by weight mineral oil and 91 parts by weight styrene. The resulting mixture was stirred under mild agitation for 16 hours. This mixture was then polymerized at 100° C., using a catalyst mixture comprising 0.025 parts benzoyl peroxide and 0.012 parts azobis isobutryonitrile.

The polymerization was terminated at 32% conversion by cooling the mixture.

A molding paste was prepared from this additive and the other ingredients shown in Table 8. The procedure described in Example 2 was used to prepare the paste. The pigment used in this example was blue dispersion of proprietary composition, sold by Plasticolors Inc.

A molding compound having 15 weight per cent fiberglass was then prepared from the molding paste, using the procedure described in Example 2.

A molded sheet was prepared from the molding compound. The good pigmentability of the molding compound was demonstrated by the uniform blue pigmentation of the molded sheet.

TABLE 8

| Experiment (all parts by wt.) | 20 |
| --- | --- |
| parts additive | 45.5 |
| parts unsaturated polyester | 53.0 |
| parts styrene | 47.0 |
| parts blue pigment | 26.2 |
| parts calcium carbonate | 224.0 |
| parts zinc stearate | 3.2 |
| parts t-butyl perbenzoate | 1.4 |
| Physical properties: | |
| paste stability | good |
| paste viscosity (cps), 25° C. | 81,000 |
| surface rating | 6½ |
| shrinkage (mils/6 inches) | −1.0 |
| tensile strength (MPa) | 33.5 |
| notched Izod impact (ft.lbs/in) | 2.92 |
| reverse notched Izod (ft.lbs/in) | 3.15 |
| Barcol hardness | 41 |
| % elastomer in compound | 0.5 |

What is claimed is:

1. A molding composition suitable for preparing an impact resistant thermoset having good surface appearance, said composition comprising:
   (a) 30–65 parts by weight of an unsaturated polyester, and correspondingly
   (b) 70–35 parts by weight of a first monomer composition, said monomer composition being copolymerizable with said unsaturated polyester and consisting of at least one ethylenically unsaturated monomer,
   (c) a polymerization initiator, and
   (d) a partially polymerized additive, said additive consisting of the polymerization product of a dispersion consisting of:
   (i) between 97 and 85 weight per cent of a second monomer composition consisting of at least one styrenic monomer, and correspondingly
   (ii) between 3 and 15 weight per cent of a single, solid emulsion polymerized acrylonitrile-butadiene copolymer elastomer,
   and wherein said single, solid elastomer is dispersed within said second monomer composition,
   and wherein said additive is prepared according to the process whereby said dispersion is polymerized such that the extent of conversion of said second monomer composition is between 10 and 90 percent,
   and wherein said additive is present in a quantity sufficient to provide between 1.5 and 10 parts by weight of said single, solid elastomer per 100 parts combined weight of said polyester plus said first monomer composition, characterized in that said molding composition does not contain more than one elastomer.

2. The composition of claim 1 further comprising fillers and a fibrous reinforcing agent.

3. The composition of claim 2 wherein said additive is included in an amount sufficient to provide between 2.0 and 5.0 parts by weight of said elastomer per 100 parts combined weight of said unsaturated polyester plus said first monomer composition.

4. The composition of claim 2 wherein said first monomer composition and said second monomer composition consist of styrene.

5. The composition according to claim 1 wherein said partially polymerized additive is prepared according to the process whereby said dispersion is thermally polymerized.

6. The composition of claim 1 wherein said first monomer composition and said second monomer composition consist of styrene.

* * * * *